United States Patent Office 2,753,347
Patented July 3, 1956

2,753,347

DIHYDROOROTIC ACID

Charles S. Miller, Lansdale, Edward L. Engelhardt, Ambler, and Janice T. Gordon, Ardmore, Pa., assignors to Merck & Co., Inc., Rahway, N. J., a corporation of New Jersey No Drawing. Original application April 12, 1954, Serial No. 422,671. Divided and this application April 15, 1955, Serial No. 502,226

1 Claim. (Cl. 260—260)

This invention relates to a new composition of matter, D-dihydroorotic acid, and more particularly to a compound which serves as an antimetabolite for nucleic acid synthesis. The compound of this invention has the structural formula:

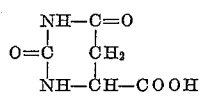

This invention also comprises the process of synthesizing the D-, and L-, enantiomorphs as well as the DL-racemate of dihydroorotic acid from the corresponding D-, L-, and DL-N$^\alpha$-carbethoxyasparagines. The products of the present invention are of interest because of their growth promoting or inhibiting properties with respect to pyrimidine utilization in various strains of Lactobacilli.

For some time chemists have been puzzled by the nature of the compound synthesized by M. Bachtez and G. Cavallini, Ber. 66B, 681 (1933), which they called "dihydroorotic acid." As discussed by Wright, L. D., Driscoll, C. A., Miller, C. S., and Skeggs, H. R., Proc. Soc. Exp. Biol. and Med., 84, 716 (1953), the addition of orotic acid to *Lactobaccillus bulgaricus* 09 on a semisynthetic medium results in good growth of the *Lactobacillus bulgaricus* 09. Ureidosuccinic acid in considerably larger amounts may be substituted for orotic acid. Both are utilized for pyrimidine nucleotide, and presumably, therefore, nucleic acid synthesis. If ureidosuccinic acid is an acylic precursor of the pyrimidine ring it can be visualized to yield orotic acid by one of two alternate pathways, (a) cyclization to dihydroorotic acid followed by dehydrogenation to orotic acid, or, (b) dehydrogenation to ureidofumaric acid followed by cyclization to orotic acid. This may be illustrated as follows:

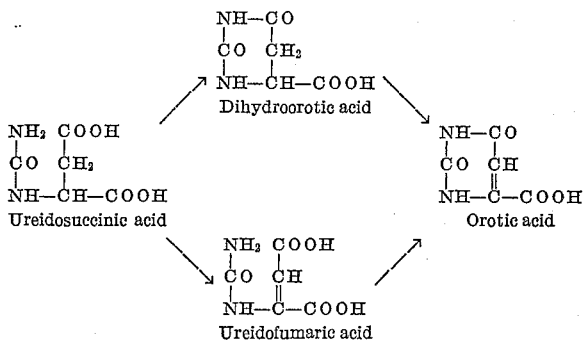

The compound synthesized by the method of Bachtez and Cavallini which they called dihydroorotic acid was tested for growth promoting activity with *Lactobacillus bulgaricus* 09 and was proved to be inactive. This was taken as evidence for the participation of ureidofumaric acid rather than dihydroorotic acid in the biosynthesis of orotic acid from ureidosuccinic acid. An enzyme system which reversibly converts DL-dihydroorotic acid to orotic acid but which would not utilize the "dihydroorotic acid" synthesized by the method of Bachtez and Cavallini was recently discovered by J. Lieberman and A. Kornberg, Federation Proc. 12, 239 (1953). Unequivocal evidence described by Miller, C. S., Gordon, J. T., and Englehardt, E. L., J. Am. Chem. Soc. 75, 6086 (1953) shows that applicants' synthetic procedure for the synthesis of DL-dihydroorotic acid from N$^\alpha$-carbethoxy-DL-asparagine yields a product which differs in melting point, infrared spectrum and solubility from the material prepared by the method of Bachtez and Cavallini. An attempt to resolve the material prepared by the method of Bachtez and Cavallini into D and L isomers by recrystallization of its brucine salt was unsuccessful. There exists, then, as a result of the foregoing conclusive evidence that Bachtez and Cavallini did not in fact isolate dihydroorotic acid. As dihydroorotic acid is asymmetric about position 6, D and L forms as well as a DL racemate are theoretically possible.

The new compound D-dihydroorotic acid and the process for preparing L and DL dihydroorotic acid can be described as follows: D-, L-, or DL-, N$^\alpha$-carbethoxy-asparagine is refluxed in an ethanol solution containing at least 2 molar equivalents of sodium ethoxide to give the sodium salt of dihydroorotic acid. Subsequent acidification gives the corresponding D-, L-, or DL-dihydroorotic acid in yields up to 70%.

Methyl alcohol has also been used in place of ethyl alcohol. Particular care must be exercised in acidifying the sodium salt of dihydroorotic acid to form dihydroorotic acid. The generation of heat during acidification may convert the dihydroorotic acid to ureidosuccinic acid. The process can be illustrated schematically as follows:

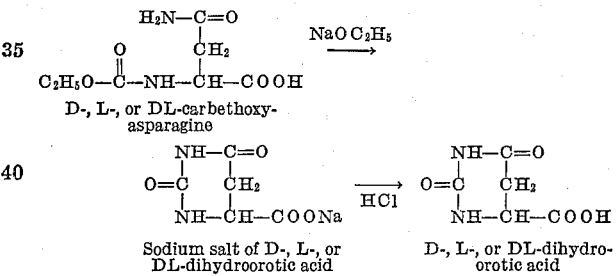

A particularly novel feature of this invention is the fact that D-, L-, or DL-, N$^\alpha$-carbethoxyasparagine respectively can be converted to the corresponding D-, L-, or DL-dihydroorotic acid. It is well-known by experts in this art that synthetic procedures applied to asymmetric starting materials generally give the racemate product exclusively. Although it is true in this case that the asymmetric center of N$^\alpha$-carbethoxyasparagine is not directly utilized during the course of reaction, one would expect racemization due to the presence of the alkaline environment. That this does not occur to any appreciable extent is evidenced by the small differential in optical rotation ($\alpha$)-2.75 obtained when dihydroorotic acid is converted to its brucine salt, recrystallized, and decomposed back to the free dihydroorotic acid. This small differential of ($\alpha$)-2.75 represents the maximum amount of racemization obtained under reflux.

Microbiological tests also have demonstrated that L-dihydroorotic acid is utilized by some but not all of a number of pyrimidineless lactobacilli. When employed in large amounts D-dihydroorotic acid in an antimetabolite of L-dihydroorotic acid in pyrimidine utilization. The L- and DL-dihydroorotic acids are precursors to the biological pyrimidines, i. e., thymine, uracil, cytosine and hydroxymethyl cytosine; these pyrimidines being basic structures of the nucleic acids. D-dihydroorotic acid has been found to be an antimetabolite of L-dihydroorotic acid in pyrimidine utilization.

Specifically it has been found to inhibit the orotic acid utilization of those organisms which have a requirement for it in order to grow. In general it may be said to inhibit bacterial growth.

The following examples are given as illustrations of this invention, but details as given therein are not to be construed as limiting the scope thereof.

*Example I*

A solution of sodium ethylate was prepared by dissolving (bright) (freshly cut) sodium (0.5 g., 0.02 mole) in dry ethanol (60 ml.) under reflux condenser and soda-lime tube protection. To the warm solution was added $N^{\alpha}$-carbethoxy-L-asparagine (2 g., 0.01 mole) and the mixture refluxed gently for four hours. Solid material begins separating immediately after the addition of the $N^{\alpha}$-carbethoxy-L-asparagine. After cooling, the white solid was filtered, dried over $P_2O_5$ in vacuo and dissolved in a minimum of cold water. Immediately solution was made strongly acid to Congo red with concentrated hydrochloric acid while chilling. The resulting white solid was filtered and dried. Yield 1.11 g. (70%); dec. 266° C.; $(\alpha)^{25.3}D+33.23°$ (C 1.992) in 1% $NaHCO_3$.

*Example II*

A solution of sodium ethylate was prepared by dissolving (bright) (freshly cut) sodium (0.5 g., 0.02 mole) in dry ethanol (60 ml.) under reflux condenser and soda-lime tube protection. To the warm solution was added $N^{\alpha}$-carbethoxy-D-asparagine (2 g., 0.01 mole) and the mixture refluxed gently for four hours. Solid material begins separating immediately after the addition of the $N^{\alpha}$-carbethoxy-D-asparagine. After cooling, the white solid was filtered, dried over $P_2O_5$ in vacuo and dissolved in a minimum of cold water. Immediately the solution was made strongly acidic to Congo red with concentrated hydrochloric acid while chilling. The resulting white solid was filtered and dried. Yield 1.11 g. (70%); dec. 266° C.; $(\alpha)^{25.3}D-31.54°$ (C 2.01) in 1% $NaHCO_3$.

*Example III*

A solution of sodium ethylate was prepared by dissolving (bright) (freshly cut) sodium (0.5 g., 0.02 mole) in dry ethanol (60 ml.) under reflux condenser and soda-lime tube protection. To the warm solution was added $N^{\alpha}$-carbethoxy-DL-asparagine (2 g., 0.01 mole) and the mixture refluxed gently for four hours. Solid material begins separating immediately after the addition of the $N^{\alpha}$-carbethoxy-DL-asparagine. After cooling, the white solid was filtered, dried over $P_2O_5$ in vacuo and dissolved in a minimum of cold water. Immediately the solution was made strongly acidic to Congo red with concentrated hydrochloric acid while chilling. The resulting white solid was filtered and dried. Yield 1.11 g. (70%); dec. 259° C. $(\alpha)^{25.3}=0$.

While the invention has been described with particular reference to specific embodiments, it is to be understood that it is not to be limited thereto but is to be construed broadly and restricted solely by the scope of the appended claim.

What is claimed is:

The method of preparing DL-dihydroorotic acid that comprises heating $N^{\alpha}$-carbethoxy-DL-asparagine with at least 2 molar equivalents of sodium ethoxide followed by acidifying the resultant solid and recovering the precipitated DL-dihydroorotic acid product.

No references cited.